(12) United States Patent
Iwasaki

(10) Patent No.: US 11,274,174 B2
(45) Date of Patent: *Mar. 15, 2022

(54) POLYMER, RESIN COMPOSITION, LIGHT CONTROL MATERIAL, OPTICAL WAVEGUIDE MATERIAL, ATHERMAL OPTICAL ELEMENT, COLOR DISPLAY ELEMENT, AND OPTICAL MATERIAL

(71) Applicant: Ricoh Company, Ltd., Tokyo (JP)

(72) Inventor: Koji Iwasaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 15/921,104

(22) Filed: Mar. 14, 2018

(65) Prior Publication Data

US 2018/0201713 A1 Jul. 19, 2018

Related U.S. Application Data

(63) Continuation of application No. PCT/JP2016/076982, filed on Sep. 13, 2016.

(30) Foreign Application Priority Data

Sep. 15, 2015 (JP) ................................. 2015-181767

(51) Int. Cl.
*C08F 220/54* (2006.01)
*C08F 220/56* (2006.01)
(Continued)

(52) U.S. Cl.
CPC ...... *C08F 220/286* (2020.02); *C08F 220/306* (2020.02); *C08F 220/54* (2013.01);
(Continued)

(58) Field of Classification Search
CPC .... C08F 220/54; C08F 220/56; C08L 101/12; G02B 1/04; G02B 1/045
See application file for complete search history.

(56) References Cited

U.S. PATENT DOCUMENTS 6,228,965 B1 * 5/2001 Muta .......................... C09J 7/38
526/328.5
6,833,176 B2 * 12/2004 Chisholm ......... C08F 222/1006
359/459

(Continued)

FOREIGN PATENT DOCUMENTS

JP 2002-265509 A 9/2002
JP 2008-046547 A 2/2008
(Continued)

OTHER PUBLICATIONS

Shieh et al, "Sequence length distribution affects the lower critical solution temperature, glass transition temperature, and CO2-responsiveness of N-isopropylacrylamide/methacrylic acid copolymers" (2018) Polymer 143 258-270 (Year: 2018).*

(Continued)

*Primary Examiner* — Ling Siu Choi
*Assistant Examiner* — David L Miller
(74) *Attorney, Agent, or Firm* — Grüneberg and Myers PLLC

(57) ABSTRACT

Provided is a polymer including a temperature-responsive unit in a molecule, wherein the polymer has a refractive index difference (B−A) of 0.01 or greater but 0.2 or less between a minimum refractive index A of the polymer in a temperature range of 5 degrees C. or higher but lower than 30 degrees C. and a maximum refractive index B of the polymer in a temperature range of 30 degrees C. or higher but lower than 50 degrees C.

15 Claims, 1 Drawing Sheet

(51) Int. Cl.
  *C08F 220/28* (2006.01)
  *C08L 101/12* (2006.01)
  *G02B 1/04* (2006.01)
  *G02B 6/12* (2006.01)
  *C08L 71/02* (2006.01)
  *C08F 220/30* (2006.01)

(52) U.S. Cl.
  CPC ............ *C08F 220/56* (2013.01); *C08L 71/02* (2013.01); *C08L 101/12* (2013.01); *G02B 1/04* (2013.01); *G02B 1/045* (2013.01); *G02B 6/12* (2013.01); *C08F 220/281* (2020.02); *C08F 220/283* (2020.02); *C08F 220/301* (2020.02)

(56) References Cited

U.S. PATENT DOCUMENTS

| | | | | |
|---|---|---|---|---|
| 10,562,993 | B2* | 2/2020 | Iwasaki | C08F 20/30 |
| 2002/0193487 | A1 | 12/2002 | Sakurai et al. | |
| 2003/0219535 | A1 | 11/2003 | Chang et al. | |
| 2004/0122178 | A1* | 6/2004 | Huang | H01M 4/621 525/221 |
| 2009/0081261 | A1* | 3/2009 | Thevenet | A61K 8/19 424/401 |
| 2009/0130384 | A1* | 5/2009 | Tamiya | C12N 5/0068 428/131 |
| 2010/0076105 | A1* | 3/2010 | Hu | C08F 2/48 522/33 |
| 2013/0003389 | A1* | 1/2013 | Moroishi | C09J 7/22 362/311.01 |
| 2015/0197628 | A1 | 7/2015 | Ihara et al. | |

FOREIGN PATENT DOCUMENTS

| | | | |
|---|---|---|---|
| JP | 2010-215784 | A | 9/2010 |
| JP | 2010215784 | A * | 9/2010 |
| JP | 2012-247620 | A | 12/2012 |
| JP | 5763355 | B | 6/2015 |
| JP | 2016-210955 | A | 12/2016 |
| WO | WO2013/191130 | A1 | 12/2013 |

OTHER PUBLICATIONS

Pollock, Jacob et al, "Mechanical and sweeling characterizatin of poly (N-isopropylacrylamide-co-methoxy poly (ethylene glycol) methacrylate) sol-gel" 2010, Acta Biomaterialia, 6, p. 1307-1318 (Year: 2010).*
Extended European Search Report dated Jul. 2, 2018 in Patent Application No. 16846456.8, 7 pages.
Moshrefzadeh, R. S. et al., "Temperature Dependence of Index of Refraction of Polymeric Waveguides", Journal of Lightwave Technology, vol. 10, No. 4, Apr. 1992, XP000272899, pp. 420-425.
Garner, B. W. et al., "Refractive Index Change Due to Volume-Phase Transition in Polyacrylamide Gel Nanospheres for Optoelectronics and Bio-photonics", Applied Physics Express, vol. 2, 2009, XP055487735, pp. 057001-1-057001-3 with cover page.
International Search Report dated Nov. 1, 2016 for counterpart International Patent Application No. PCT/JP2016/076982 filed Sep. 13, 2016 (with English translation of Category of Cited Documents).
Written Opinion of the International Searching Authority dated Nov. 1, 2016 for counterpart International Patent Application No. PCT/JP2016/076982 filed Sep. 13, 2016.
H. Kudo, et. al. Macromolecules, 42, (2009), pp. 1051-1057.
Recent Advance on Photonic Organic Materials for Information and Telecommunication Applications, CMC Publishing Co., Ltd., ISBN Code:978-4-88231-683-1 (with English translation).
Combined Chinese Office Action and Search Report dated Aug. 21, 2019 in corresponding Chinese Patent Application No. 201680053140.2 (with English Translation), 14 pages.
Office Action dated May 14, 2019 in Japanese Patent Application No. 2017-539913 (with English Translation).
Office Action dated Sep. 3, 2019 in Japanese Patent Application No. 2017-539913 (with English Translation).

* cited by examiner

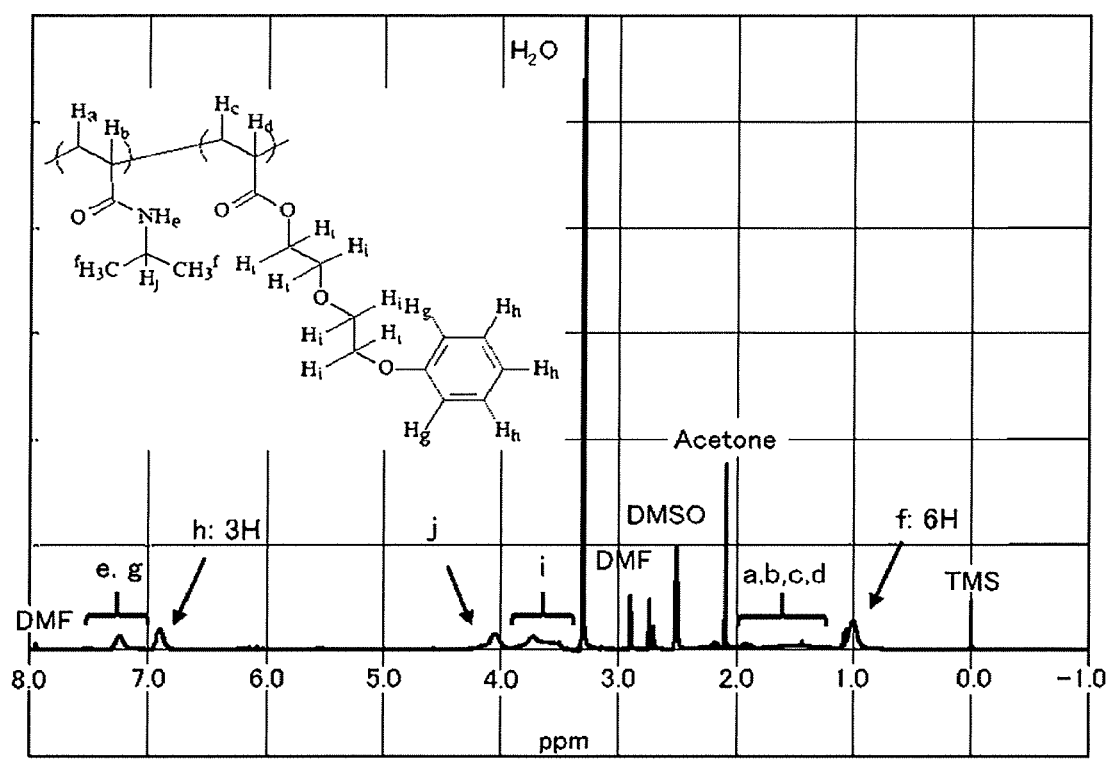

POLYMER, RESIN COMPOSITION, LIGHT CONTROL MATERIAL, OPTICAL WAVEGUIDE MATERIAL, ATHERMAL OPTICAL ELEMENT, COLOR DISPLAY ELEMENT, AND OPTICAL MATERIAL

CROSS-REFERENCE TO RELATED APPLICATIONS

The present application is a continuation application of International Application No. PCT/JP2016/076982, filed Sep. 13, 2016, which claims priority to Japanese Patent Application No. 2015-181767, filed Sep. 15, 2015. The contents of these applications are incorporated herein by reference in their entirety.

BACKGROUND OF THE INVENTION

Field of the Invention

The present disclosure relates to a polymer, a resin composition, a light control material, an optical waveguide material, an athermal optical element, a color display element, and an optical material.

Description of the Related Art

In recent years, development of organic materials that respond to external stimuli has progressed. There are known materials of which electric resistance values change in response to temperature changes (for example, see Japanese Patent No. 5763355). With conductive particles dispersed in resins, these materials switch electric resistance by means of volume changes of the resins in response to temperature changes.

There are also been known materials that are intended for application to optical elements (for example, see H. KUDO, et. al. Macromolecules, 42, 1051 (2009)). These materials change molecular structures in response to ultraviolet rays included in the sunlight, and are highly useful because the materials do not need electric energy. These materials can also change molecular refractive indices through ultraviolet-induced isomerization reactions. The world's top-level refractive index drop width of these materials is 0.1. As can be seen, there are known materials that have functions (photo-switching functions) of changing, for example, refractive indices in response to external stimuli, and expected uses of these materials are optical materials and light control materials.

SUMMARY OF THE INVENTION

According to one aspect of the present disclosure, a polymer includes a temperature-responsive unit in a molecule, and has a refractive index difference (B−A) of 0.01 or greater but 0.2 or less between a minimum refractive index A of the polymer in a temperature range of 5 degrees C. or higher but lower than 30 degrees C. and a maximum refractive index B of the polymer in a temperature range of 30 degrees C. or higher but lower than 50 degrees C.

BRIEF DESCRIPTION OF THE DRAWINGS

FIG. 1 is a diagram illustrating a nuclear magnetic resonance spectrum of an example of a polymer according to the present disclosure.

DESCRIPTION OF THE EMBODIMENTS

The present disclosure has an object to provide a polymer excellent in temperature-responsive photo-switchability.

The present disclosure can provide a polymer excellent in temperature-responsive photo-switch ability.

(Polymer)

A polymer according to the present disclosure will be described with reference to the drawing. The present disclosure should not be construed as being limited to the embodiment described below, but changes such as other embodiments, addition, modification, and deletion are available within the scope of conception of a person skilled in the art. Any mode is to be included within the scope of the present disclosure, so long as that mode has the working and effect of the present disclosure. Details will be described below.

The polymer of the present disclosure has a temperature-responsive unit in a molecule, and has a refractive index difference (B−A) of 0.01 or greater but 0.2 or less between a minimum refractive index A of the polymer in a temperature range of 5 degrees C. or higher but lower than 30 degrees C. and a maximum refractive index B of the polymer in a temperature range of 30 degrees C. or higher but lower than 50 degrees C.

The polymer of the present disclosure is based on a finding that with existing materials, development of organic materials that respond to outdoor temperatures has been considerably problematic in terms of possibilities of applications as optical materials such as smart lenses and optical waveguides, and light control materials.

How such materials as described above having the photo-switching functions are made to express light control functions or optical waveguide control functions is by reducing the densities of the materials to reduce the refractive indices of the materials. Many such organic materials have been known. On the other hand, there have not been known any materials that can be used for, for example, smart lenses of which degrees increase in response to temperature rises or color filters of which filtering performances increase in accordance with outdoor temperatures. This is because, as described in Latest technologies of optical organic materials for information and communications (CMC Publishing Co., Ltd., ISBN code: 978-4-88231-683-1), ordinary organic materials undergo a universal, unavoidable phenomenon of being reduced in the densities as a result of activated molecular motions in response to temperature rises. That is, the polymer is based on a finding that there have not yet been reported such materials as described above, and that the range of application of temperature-responsive photo-switching materials has been limited.

[Refractive Index Difference (B−A)]

The refractive index difference (B−A) between a minimum refractive index A of the polymer in a temperature range of 5 degrees C. or higher but lower than 30 degrees C. and a maximum refractive index B of the polymer in a temperature range of 30 degrees C. or higher but lower than 50 degrees C. is 0.01 or greater but 0.2 or less and preferably 0.02 or greater but 0.2 or less. When the refractive index difference (B−A) is 0.01 or greater, reflectance of light having a specific wavelength can be can be improved. When the refractive index difference (B−A) is 0.2 or less, transmittance of visible light can be improved.

The minimum refractive index A and the maximum refractive index B can be evaluated with, for example, an Abbe refractometer (apparatus name: DR-M2/1550, available from Atago Co., Ltd.) in the manner described below.

An obtained polymer and an obtained resin composition are molded by hot melt molding to produce a test piece having a width of 10 mm, a thickness of 2 mm, and a length of 20 mm. The test piece is put on the prism of the Abbe refractometer. The refractive indices can be measured with monobromonaphthalene used as an intermediate liquid.

What matters in the configuration of the molecular structure of the polymer of the present disclosure is that the polymer includes temperature-responsive units, of which any one or both of the molecular structure and the polymer chain structure change(s) in accordance with the temperature. With the temperature-responsive units, the polymer can express the function (photo-switching function) of changing, for example, the refractive index in response to the temperature.

Examples of the temperature-responsive units include; units that change structures through heat isomerization, such as azobenzene and diarylethene; hydrogen bond units such as a hydroxyl group, a carbonyl bond, and an amide bond; and any combinations of these units. Among these temperature-responsive units, hydrogen bond units are preferable because hydrogen bond units are excellent in photo-switching function repetition durability. Hydrogen bond units that contain an amide bond and have the hydrogen bonding strength between the hydrogen bond units start to decrease at a temperature around 40 degrees C. are more preferable.

The temperature-responsive units are not particularly limited and may be appropriately selected depending on the intended purpose. The temperature-responsive units may be introduced in a straight chain of a polymer, or may be introduced in a branched chain of a branched polymer such as a star-shaped polymer or a hyper branched polymer. There is a tendency that branched polymers have a better responsiveness to heat. This is because branched polymers have lower glass transition temperatures than straight-chain polymers.

The glass transition temperature of the polymer is not particularly limited, may be appropriately selected depending on the intended purpose, and is preferably lower than 80 degrees C., more preferably 40 degrees or lower, and particularly preferably 0 degrees C. or lower in order for the polymer to express a high-speed refractive index responsiveness. When the glass transition temperature of the polymer is lower than 80 degrees C., the polymer has a high temperature response speed and is suitable for use. The glass transition temperature of the polymer is preferably −50 degrees C. or higher. When the glass transition temperature of the polymer is −50 degrees C. or higher, the polymer can have an improved shape retainability.

It is preferable that the molecular structure of the polymer of the present disclosure include an ether bond such as an alkyl ether structure and a phenyl ether structure. With the ether bond, intermolecular interaction acts not only between the temperature-responsive units but also between a temperature-responsive unit and the ether bond, leading to an improved performance of the photo-switching function. Among ether bonds, an alkyl ether structure is more preferable. This is because an alkyl ether structure has a small steric hindrance and can easily interact with the temperature-responsive units, leading to expression of a higher photo-switching functionality.

As described above, it is preferable that the hydrogen bond units of the polymer of the present disclosure contain an amide bond, and that the ether bond be an alkyl ether structure.

The number average molecular weight (Mn) of the polymer is not particularly limited, may be appropriately selected depending on the intended purpose, and is preferably from 1,000 through 1,000,000.

The weight average molecular weight (Mw) of the polymer is not particularly limited, may be appropriately selected depending on the intended purpose, and is preferably from 1,000 through 1,000,000.

The molecular weight distribution (weight average molecular weight (Mw)/number average molecular weight (Mn)) of the polymer is not particularly limited, may be appropriately selected depending on the intended purpose, and is preferably from 1.0 through 3.0.

The number average molecular weight (Mn), the weight average molecular weight (Mw), and the molecular weight distribution (Mw/Mn) can be measured by, for example, a gel permeation chromatography (GPC) method in the manner described below.

Instrument: HLC-8220 (available from Tosoh Corporation)

Columns: SHODEX ASAHIPAK GF-510 HQ+GF-310×2 (available from Showa Denko K. K.), TSK G2000HXL and G4000HXL (available from Tosoh Corporation)

Temperature: 40 degrees C.

Eluent: 20 mM lithium bromide, and a 20 mM phosphoric acid-containing dimethylformamide solution Flow rate: 0.5 mL/minute Detector: HLC-8200 with built-in RI-UV-8220

A sample (1 mL) having a concentration of 0.5% by mass is set in the instrument, and the molecular weight distribution of the polymer is measured under the conditions described above. Based on the measured molecular weight distribution, the number average molecular weight (Mn) and the weight average molecular weight (Mw) of the polymer are calculated, using a molecular weight calibration curve generated based on monodisperse polystyrene standard samples. The molecular weight distribution is a value obtained by dividing Mw by Mn.

The structure of the polymer can be analyzed by a common analyzing method such as nuclear magnetic resonance spectrometry (NMR) and IR.

In the case of nuclear magnetic resonance spectrometry (NMR), the structure of the polymer can be identified in the manner described below.

Instrument: JOEL-ECS-400K (available from JOEL Ltd.)

With the degree of polymerization set to n, the number of hydrogens in each moiety is measured and calculated by magnetic resonance spectrometry ($^1$H-NMR).

<Method for Producing Polymer>

Next, a method for producing the polymer will be described.

The method for producing the polymer is not particularly limited and may be freely selected depending on the structure of the monomer to be used.

Examples of a producing method of the present embodiment include a method of producing the polymer using a compound represented by Structural formula (1) below and a compound represented by General formula (2) below.

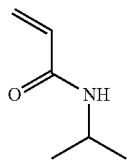

Structural formula (1)

The compound represented by Structural formula (1) may be N-isopropyl acrylamide. However, in the present embodiment, the compound is not limited to N-isopropyl acrylamide. Other examples include hydroxyethyl acrylamide.

General formula (2)

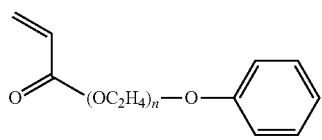

In General formula (2), n is not particularly limited and may be appropriately changed.

Examples of the compound represented by general formula (2) include phenoxypolyethylene glycol acrylate, which is an example in which n=2.

Other examples include 2-acryloyloxyethyl succinate, methoxypolyethylene glycol acrylate, glycol acrylate, phenoxyethyl acrylate, hydroxybutyl acrylate, hydroxyethyl acrylate, and hydroxypropyl acrylate. One of these compounds may be used alone or two or more of these compounds may be used in combination.

Among the compounds represented by Structural formula (1) and the compounds represented by General formula (2), N-isopropyl acrylamide, phenoxypolyethylene glycol acrylate, 2-acryloyloxyethyl succinate, and methoxypolyethylene glycol acrylate are preferable.

An example of the polymer produced using the compound represented by Structural formula (1) and the compound represented by General formula (2) is represented by General formula (3) below as a polymer A.

General formula (3)

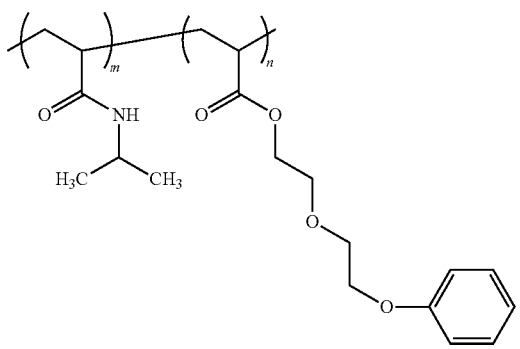

In General formula (3), m and n are not particularly limited and may be appropriately changed.

Next, a specific example of the method for producing the polymer of the present embodiment will be described. The present disclosure is not limited to the example described below.

A commercially available product of N-isopropyl acrylamide represented by Structural formula (1) (0.3 mmol) is used as the hydrogen bond unit. A commercially available product of phenoxypolyethylene glycol acrylate represented by General formula (2) (in General formula (2), n=2) (0.3 mmol) is used as the alkyl ether structure. 2,2'-Azobis isobutyronitrile (AIBN) (0.05 mmol) is used as a radical initiator. N,N-dimethylformamide (DMF) (from 3 mL through 20 mL) is used as a polymerization solvent. These materials are subjected to freeze-pump-thaw degassing, then sealed in a tube, stirred at 60 degrees C. for 24 hours, and subjected to production by a radical polymerization method, to obtain a reaction liquid. The obtained reaction liquid is concentrated at a reduced pressure, diluted with chloroform (1.0 mL), and dropped into diethyl ether, to deposit a white precipitate. The deposited precipitate is filtered off and subjected to vacuum drying at 40 degrees C. for 24 hours. In this way, a polymer A of the present embodiment can be obtained.

A nuclear magnetic resonance spectrum of the polymer A obtained in the present embodiment is illustrated in FIG. 1. FIG. 1 illustrates an example of a result of measurement at 25 degrees C.

By changing the mixing ratio between N-isopropyl acrylamide and phenoxypolyethylene glycol acrylate, it is possible to arbitrarily control the composition of the polymer to be obtained.

The ratio between the structural unit attributable to N-isopropyl acrylamide and the structural unit attributable to phenoxypolyethylene glycol acrylate is preferably from 6:4 through 3:7. When the ratio is from 6:4 through 3:7, a better performance of the photo-switching function can be obtained.

(Resin Composition)

A resin composition of the present disclosure contains the polymer of the present disclosure in an amount of 100 ppm by mass or greater, and further contains other components as needed. With the polymer of the present disclosure in an amount of 100 ppm by mass or greater, particularly, tensile strength, dimensional stability, and the photo-switching function can be improved. The resin composition can be suitably used for optical materials and light control materials.

Examples of the materials that constitute the resin composition include the polymer of the present disclosure and a third component.

The third component is not particularly limited and may be appropriately selected depending on the intended purpose. The third component may be freely selected from, for example, carbonate resins such as polycarbonate and polyalkylene carbonate, polyester resins such as polyethylene terephthalate and polybutylene terephthalate, known resins such as polyglycerin stearic acid ester, polyvinyl alcohol, polyacrylonitrile, and polystyrene, and known inorganic materials such as soda-lime glass and quartz glass depending on a desired strength and a desired transparency. One of these third components may be used alone or two or more of these third components may be used in combination. Among these third components, polyglycerin stearic acid ester is preferable. Additives such as an antioxidant, a thermal deterioration preventing agent, a plasticizer, an inorganic filler, inorganic particles, a pigment, and a dye may also be added as needed.

(Light Control Material, Optical Waveguide Material, Athermal Optical Element, Color Display Element, and Optical Material)

A light control material of the present disclosure contains the polymer of the present disclosure or the resin composition of the present disclosure and further contains other components as needed.

An optical waveguide material of the present disclosure contains the polymer of the present disclosure or the resin composition of the present disclosure and further contains other components as needed.

An athermal optical element of the present disclosure contains the polymer of the present disclosure or the resin composition of the present disclosure and further contains other components as needed.

A color display element of the present disclosure contains the polymer of the present disclosure or the resin composition of the present disclosure and further contains other components as needed.

An optical material of the present disclosure contains the polymer of the present disclosure or the resin composition of the present disclosure and further contains other components as needed.

The polymer and the resin composition of the present disclosure can be suitably used for the light control material, the optical waveguide material, the athermal optical element, the color display element, and the optical material for, for example, a smart lens.

The light control material is not particularly limited and may be appropriately selected depending on the intended purpose. Examples of the light control material include materials for controlling transmittance and reflectance of light, such as an anti-reflection film. The refractive indices of the polymer and the resin composition of the present disclosure can be controlled in accordance with the outdoor temperature. Hence, the polymer and the resin composition can realize light control without consuming an electric energy. Therefore, the polymer and the resin composition can be suitably used for this purpose.

The optical waveguide material is not particularly limited and may be appropriately selected depending on the intended purpose. Examples of the optical waveguide material include an inorganic optical waveguide material and an organic optical waveguide material. The polymer and the resin composition of the present disclosure have a high transparency, and the refractive indices of the polymer and the resin composition can be controlled with a thermal energy in a range approximately equivalent to room temperature. Therefore, the polymer and the resin composition can realize photo-switching with a simpler mechanism than ever, and hence can be suitably used for this purpose. Furthermore, the polymer and the resin composition can easily dissolve in various solvents. Hence, the polymer and the resin composition have a wide range of applications, such as use as a coating over an inorganic optical waveguide material.

The athermal optical element is not particularly limited and may be appropriately selected depending on the intended purpose. Examples of the athermal optical element include an organic lens. Refractive indices of existing polymers drop by thermal energy. However, when combined with the polymer and the resin composition of the present disclosure, the existing polymers can provide a lens having a substantially non-fluctuating refractive index. Therefore, the polymer and the resin composition of the present disclosure can be suitably used for this purpose.

The color display element is not particularly limited and may be appropriately selected depending on the intended purpose. Examples of the color display element include a color filter obtained by combining a high-refractive-index material and a low-refractive-index material. By using the polymer and the resin composition of the present disclosure for one of the materials, it is possible to control the wavelength of the light to be filtered, in accordance with the external thermal energy. Combined use of the polymer and the resin composition with a temperature control element can realize various kinds of chromatic expressions with a single structure. Therefore, the polymer and the resin composition can be suitably used for this purpose.

The optical material for, for example, a smart lens is not particularly limited and may be appropriately selected depending on the intended purpose. Examples of the optical material include lenses for, for example, cameras and robots, and optical diodes. The polymer of the present disclosure can be molded into a lens shape. Therefore, it is possible to produce a smart lens of which focal length or degree can be freely controlled in accordance with external thermal energy. Furthermore, the polymer has an extremely wide range of applications in the field of optical materials, because the polymer can be coated on existing inorganic lenses to provide a temperature responding function to the lenses.

As described above, the polymer and the resin composition of the present disclosure are novel materials of which refractive indices increase in accordance with rise of the outdoor temperature. With the temperature-responsive photo-switching characteristic taken advantage of, the materials can be suitably used for such applications as light control materials, optical waveguide materials, athermal optical elements, color display elements, and optical materials.

EXAMPLES

The present disclosure will be described below more specifically by way of Examples. The present disclosure should not be construed as being limited to these Examples.
(Measuring Methods)

The methods for analyzing polymers and resin compositions obtained in Examples and Comparative Examples will be described in detail below as follows.

<Calculation of Number Average Molecular Weight, Weight Average Molecular Weight, and Molecular Weight Distribution>

The number average molecular weight (Mn), the weight average molecular weight (Mw), and the molecular weight distribution (Mw/Mn) were measured by a gel permeation chromatography (GPC) method in the manner described below.

Instrument: HLC-8220 (available from Tosoh Corporation)
Columns: SHODEX ASAHIPAK GF-510 HQ+GF-310×2 (available from Showa Denko K. K), TSK G2000HXL and G4000HXL (available from Tosoh Corporation)
Temperature: 40 degrees C.
Eluent: 20 mM lithium bromide, and a 20 mM phosphoric acid-containing dimethylformamide solution
Flow rate: 0.5 mL/minute
Detector: HLC-8200 with built-in RI-UV-8220

A sample (1 mL) having a concentration of 0.5% by mass was set in the instrument, and the molecular weight distribution of the polymer was measured under the conditions described above. Based on the measured molecular weight distribution, the number average molecular weight (Mn) and the weight average molecular weight (Mw) of the polymer were calculated, using a molecular weight calibration curve generated based on monodisperse polystyrene standard samples. The molecular weight distribution was a value obtained by dividing Mw by Mn.

<Nuclear Magnetic Resonance Spectrometry>

An obtained polymer was identified by nuclear magnetic resonance spectrometry in the manner described below.

Instrument: JOEL-ECS-400K (available from JOEL Ltd.)

With the degree of polymerization set to n, the number of hydrogens in each moiety was measured and calculated by magnetic resonance spectrometry ($^1$H-NMR).

Example 1

N-isopropyl acrylamide (product number: 2210-25-5, available from Tokyo Chemical Industry Co., Ltd.) (0.3 mmol), phenoxypolyethylene glycol acrylate (product number: 56641-05-5, available from Shin-Nakamura Chemical Co., Ltd.) (0.3 mmol), 2,2'-azobis isobutyronitrile (AIBN, product number: 78-67-1, available from Tokyo Chemical Industry Co., Ltd.) (0.05 mmol), and N,N-dimethylformamide (DMF, available from Tokyo Chemical Industry Co., Ltd.) (3.0 mL) were added in a polymerization tube, dissolved, subjected to freeze-pump-thaw degassing, and then sealed in the tube. The polymerization tube was heated to 60 degrees C., to allow the materials to undergo a reaction for 20 hours. Subsequently, chloroform (1.0 mL) was added to the reaction liquid for dilution. The reaction liquid was dropped into diethyl ether, to deposit a white precipitate. The deposited precipitate was filtered off and subjected to vacuum drying at 40 degrees C. for 24 hours, to produce a polymer of the present Example.

Furthermore, the polymer of the present Example was added to polyglycerin stearic acid ester (available from Riken Vitamin Co., Ltd.) such that the content ratio of the polymer would be 50,000 ppm by mass. The resultant was melted and kneaded, to produce a resin composition of the present Example.

Physical properties of the obtained polymer were measured, and the resin composition was evaluated in various aspects. The composition of the polymer and the results of measurements are presented in Table 1 and Table 3 below.

The obtained polymer was analyzed by magnetic resonance spectrometry. The result was obtained as illustrated in FIG. 1. A hydrogen peak of each moiety was determined as illustrated.

Example 2

A polymer and a resin composition of the present Example were produced in the same manner as in Example 1, except that unlike in Example 1, 2-acryloyloxyethyl succinate represented by Structural formula (4) below (product number: 50940-49-3, available from Shin-Nakamura Chemical Co., Ltd.) was used instead of phenoxypolyethylene glycol acrylate. Physical properties of the obtained polymer were measured, and the resin composition was evaluated in the same aspects as in Example 1. The composition of the polymer and the results of measurements are presented in Table 1 and Table 3 below.

Structural formula (4)

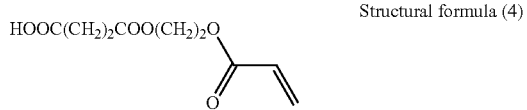

Example 3

A polymer and a resin composition of the present Example were produced in the same manner as in Example 1, except that unlike in Example 1, methoxypolyethylene glycol acrylate represented by Structural formula (5) below (product number: 32171-39-4, available from Shin-Nakamura Chemical Co., Ltd.) was used instead of phenoxypolyethylene glycol acrylate. Physical properties of the obtained polymer were measured, and the resin composition was evaluated in the same aspects as in Example 1. The composition of the polymer and the results of measurements are presented in Table 1 and Table 3 below.

Structural formula (5)

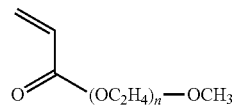

n = 9

Example 4

A polymer was produced in the same manner as in Example 1. Physical properties of the obtained polymer were measured, and the polymer was evaluated in the same aspects as in Example 1. The composition of the polymer and the results of measurements are presented in Table 1 and Table 3 below.

Example 5

A polymer of the present Example was produced in the same manner as in Example 1, except that unlike in Example 1, phenoxyethyl acrylate represented by Structural formula (6) below (product number: 48145-04-6, available from Tokyo Chemical Industry Co., Ltd.) was used instead of phenoxypolyethylene glycol acrylate. Physical properties of the obtained polymer were measured, and the polymer was evaluated in the same aspects as in Example 1. The composition of the polymer and the results of measurements are presented in Table 1 and Table 3 below.

Structural formula (6)

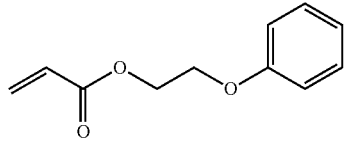

Example 6

A polymer of the present Example was produced in the same manner as in Example 1, except that unlike in Example 1, hydroxybutyl acrylate represented by Structural formula (7) below (product number: 2478-10-6, available from Tokyo Chemical Industry Co., Ltd.) was used instead of phenoxypolyethylene glycol acrylate. Physical properties of the obtained polymer were measured, and the polymer was evaluated in the same aspects as in Example 1. The composition of the polymer and the results of measurements are presented in Table 1 and Table 3 below.

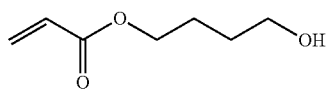

Structural formula (7)

Example 7

A polymer of the present Example was produced in the same manner as in Example 1, except that unlike in Example 1, hydroxyethyl acrylate represented by Structural formula (8) below (product number: 818-61-1, available from Tokyo Chemical Industry Co., Ltd.) was used instead of phenoxypolyethylene glycol acrylate. Physical properties of the obtained polymer were measured, and the polymer was evaluated in the same aspects as in Example 1. The composition of the polymer and the results of measurements are presented in Table 1 and Table 3 below.

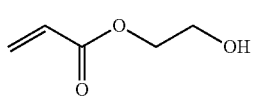

Structural formula (8)

Example 8

A polymer of the present Example was produced in the same manner as in Example 1, except that unlike in Example 1, hydroxypropyl acrylate represented by Structural formula (9) below (product number: 999-61-1, available from Sigma-Aldrich Co., LLC) was used instead of phenoxypolyethylene glycol acrylate. Physical properties of the obtained polymer were measured, and the polymer was evaluated in the same aspects as in Example 1. The composition of the polymer and the results of measurements are presented in Table 1 and Table 3 below.

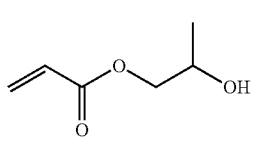

Structural formula (9)

Referential Example 9

A polymer of the present Example was produced in the same manner as in Example 1, except that unlike in Example 1, phenoxypolyethylene glycol acrylate was not used. Physical properties of the obtained polymer were measured, and the polymer was evaluated in the same aspects as in Example 1. The composition of the polymer and the results of measurements are presented in Table 1 and Table 3 below.

Example 10

A polymer of the present Example was produced in the same manner as in Referential Example 9, except that unlike in Referential Example 9, hydroxyethyl acrylamide represented by Structural formula (10) below (product number: 7646-67-5, available from Tokyo Chemical Industry Co., Ltd.) was used instead of N-isopropyl acrylamide. Physical properties of the obtained polymer were measured, and the polymer was evaluated in the same aspects as in Example 1. The composition of the polymer and the results of measurements are presented in Table 1 and Table 3 below.

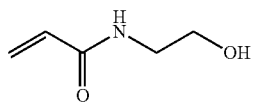

Structural formula (10)

Comparative Example 1

A polymer was produced in the same manner as in Example 1, except that unlike in Example 1, the amount of N-isopropyl acrylamide used was changed from 0.3 mmol to 0.05 mmol. Physical properties of the obtained polymer were measured, and the polymer was evaluated in the same aspects as in Example 1. The composition of the polymer and the results of measurements are presented in Table 2 and Table 3 below.

Comparative Example 2

A polymer was produced in the same manner as in Example 5, except that unlike in Example 5, the amount of N-isopropyl acrylamide used was changed from 0.3 mmol to 0.05 mmol. Physical properties of the obtained polymer were measured, and the polymer was evaluated in the same aspects as in Example 1. The composition of the polymer and the results of measurements are presented in Table 2 and Table 3 below.

Comparative Example 3

A polymer was produced in the same manner as in Example 6, except that unlike in Example 6, the amount of N-isopropyl acrylamide used was changed from 0.3 mmol to 0.05 mmol. Physical properties of the obtained polymer were measured, and the polymer was evaluated in the same aspects as in Example 1. The composition of the polymer and the results of measurements are presented in Table 2 and Table 3 below.

Comparative Example 4

A polymer was produced in the same manner as in Example 1, except that unlike in Example 1, the amount of N-isopropyl acrylamide used was changed from 0.3 mmol to 0.05 mmol, and acrylic acid represented by Structural formula (11) below (product number: 79-10-7, available from Tokyo Chemical Industry Co., Ltd.) (0.3 mmol) was used instead of phenoxypolyethylene glycol acrylate. Physical properties of the obtained polymer were measured, and the polymer was evaluated in the same aspects as in Example 1. The composition of the polymer and the results of measurements are presented in Table 2 and Table 3 below.

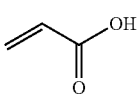

Structural formula (11)

Referential Example 1

A resin composition was produced in the same manner as in Example 1, except that unlike in Example 1, the content ratio of the polymer obtained in Example 1 was changed to 50 ppm by mass. Physical properties of the obtained polymer were measured, and the polymer was evaluated in the same aspects as in Example 1. The composition of the polymer and the results of measurements are presented in Table 2 and Table 3 below.

TABLE 1

|  |  | Ex. | | | | | | | | Ref. Ex. | Ex. |
|---|---|---|---|---|---|---|---|---|---|---|---|
|  |  | 1 | 2 | 3 | 4 | 5 | 6 | 7 | 8 | 9 | 10 |
| Monomer | N-isopropyl acrylamide (mmol) | 0.3 | 0.3 | 0.3 | 0.3 | 0.3 | 0.3 | 0.3 | 0.3 | 0.3 | — |
|  | Hydroxyethyl acrylamide (mmol) | — | — | — | — | — | — | — | — | — | 0.3 |
|  | Phenoxypolyethylene glycol acrylate (mmol) | 0.3 | — | — | 0.3 | — | — | — | — | — | — |
|  | 2-acryloyloxyethyl succinate (mmol) | — | 0.3 | — | — | — | — | — | — | — | — |
|  | Methoxypolyethylene glycol acrylate (mmol) | — | — | 0.3 | — | — | — | — | — | — | — |
|  | Phenoxyethyl acrylate (mmol) | — | — | — | — | 0.3 | — | — | — | — | — |
|  | Hydroxybutyl acrylate (mmol) | — | — | — | — | — | 0.3 | — | — | — | — |
|  | Hydroxyethyl acrylate (mmol) | — | — | — | — | — | — | 0.3 | — | — | — |
|  | Hydroxypropyl acrylate (mmol) | — | — | — | — | — | — | — | 0.3 | — | — |
|  | Acrylic acid (mmol) | — | — | — | — | — | — | — | — | — | — |
| Radical initiator | 2,2'-azobis isobutyronitrile (AIBN) (mmol) | 0.05 | 0.05 | 0.05 | 0.05 | 0.05 | 0.05 | 0.05 | 0.05 | 0.05 | 0.05 |
| Polymerization solvent | N,N-dimethylformamide (DMF) (mL) | 3.0 | 3.0 | 3.0 | 3.0 | 3.0 | 3.0 | 3.0 | 3.0 | 3.0 | 3.0 |

TABLE 2

|  |  | Comp. Ex. | | | | Ref. Ex. |
|---|---|---|---|---|---|---|
|  |  | 1 | 2 | 3 | 4 | 1 |
| Monomer | N-isopropyl acrylamide (mmol) | 0.05 | 0.05 | 0.05 | 0.05 | 0.3 |
|  | Hydroxyethyl acrylamide (mmol) | — | — | — | — | — |
|  | Phenoxypolyethylene glycol acrylate (mmol) | 0.3 | — | — | — | 0.3 |
|  | 2-acryloyloxyethyl succinate (mmol) | — | — | — | — | — |
|  | Methoxypolyethylene glycol acrylate (mmol) | — | — | — | — | — |
|  | Phenoxyethyl acrylate (mmol) | — | 0.3 | — | — | — |
|  | Hydroxybutyl acrylate (mmol) | — | — | 0.3 | — | — |
|  | Hydroxyethyl acrylate (mmol) | — | — | — | — | — |
|  | Hydroxypropyl acrylate (mmol) | — | — | — | — | — |
|  | Acrylic acid (mmol) | — | — | — | 0.3 | — |
| Radical initiator | 2,2'-azobis isobutyronitrile (AIBN) (mmol) | 0.05 | 0.05 | 0.05 | 0.05 | 0.05 |
| Polymerization solvent | N,N-dimethylformamide (DMF) (mL) | 3.0 | 3.0 | 3.0 | 3.0 | 3.0 |

TABLE 3

| | | Maximum refractive index B | Minimum refractive index A | Refractive index difference (B − A) | Tg of polymer (degree C.) | Number average molecular weight (Mn) | Weight average molecular weight (Mw) | Molecular weight distribution (Mw/Mn) | Third component |
|---|---|---|---|---|---|---|---|---|---|
| | | | | | | | Physical properties of polymer | | |
| Ex. | 1 | 1.512 | 1.493 | 0.019 | −5 | 15,400 | 24,500 | 1.59 | Polyglycerin stearic acid ester/50,000 ppm by mass |
| | 2 | 1.545 | 1.504 | 0.041 | −20 | 13,300 | 23,200 | 1.74 | Polyglycerin stearic acid ester/50,000 ppm by mass |
| | 3 | 1.585 | 1.482 | 0.103 | −48 | 11,700 | 27,800 | 2.38 | Polyglycerin stearic acid ester/50,000 ppm by mass |
| | 4 | 1.512 | 1.493 | 0.019 | −5 | 15,400 | 24,500 | 1.59 | — |
| | 5 | 1.517 | 1.496 | 0.021 | −23 | 12,800 | 25,200 | 1.97 | — |
| | 6 | 1.515 | 1.504 | 0.011 | −30 | 13,200 | 26,600 | 2.02 | — |
| | 7 | 1.494 | 1.481 | 0.013 | −17 | 19,200 | 28,900 | 1.51 | — |
| | 8 | 1.526 | 1.507 | 0.019 | 0 | 5,300 | 7,900 | 1.49 | — |
| Ref. Ex. | 9 | 1.514 | 1.496 | 0.018 | 142 | 13,100 | 26,200 | 2.00 | — |
| Ex. | 10 | 1.494 | 1.483 | 0.011 | 96 | 11,500 | 25,500 | 2.22 | — |
| Comp. Ex. | 1 | 1.489 | 1.493 | −0.004 | −48 | 10,200 | 26,100 | 2.56 | — |
| | 2 | 1.485 | 1.491 | −0.006 | −26 | 12,400 | 24,400 | 1.97 | — |
| | 3 | 1.506 | 1.505 | 0.001 | −37 | 19,200 | 24,600 | 1.28 | — |
| | 4 | 1.503 | 1.510 | −0.007 | 147 | 12,000 | 23,700 | 1.98 | — |
| Ref. Ex. | 1 | 1.516 | 1.496 | 0.020 | −5 | 14,200 | 22,800 | 1.61 | Polyglycerin stearic acid ester/50 ppm by mass |

Next, various properties of the obtained polymers or resin compositions of Examples and Comparative Examples were evaluated in the manners described below. The results are presented in Table 4 below.

<Refractive Index Change Repetition Durability>

Refractive index change repetition durability of the obtained polymer and resin composition was evaluated with an Abbe refractometer in the manner described below.

Apparatus: DR-M2/1550 (available from Atago Co., Ltd.)

The obtained polymer and resin composition were molded by hot melt molding to produce a test piece having a width of 10 mm, a thickness of 2 mm, and a length of 20 mm. The test piece was put on the prism of the Abbe refractometer. With monobromonaphthalene used as an intermediate liquid, the test piece was heated and cooled repeatedly 100 times, to obtain a refractive index difference (B–A) between the minimum refractive index A in the temperature range of 5 degrees C. or higher but lower than 30 degrees C. and the maximum refractive index B in the temperature range of 30 degrees C. or higher but lower than 50 degrees C. A ratio between the refractive index difference (B–A) and a refractive index difference (B–A) before the repeating test was calculated, to evaluate "refractive index change repetition durability" according to the evaluation criteria described below.

For example, when the refractive index difference (B–A) before the repeating test is 0.03 and the refractive index difference (B–A) after the test is 0.02, the ratio is obtained according to (B–A after test)/(B–A before test)*100=0.02/0.03*100=67%.

[Evaluation Criteria]

The value defined above was 70% or higher: 10 points
The value defined above was lower than 70%: 1 point Note that when the change width between a refractive index at 5 degrees C. and a refractive index at 40 degrees C. is less than 0.01, it is to be judged that there is no refractive index change. In this case, the mark to be given is 0 points.

<High-Speed Refractive Index Responsiveness>

High-speed refractive index responsiveness of the obtained polymer and resin composition was evaluated with an Abbe refractometer in the manner described below. A test piece was molded by hot melt molding to produce a test piece having a width of 10 mm, a thickness of 2 mm, and a length of 20 mm. Monobromonaphthalene was used as an intermediate liquid.

Apparatus: DR-M2/1550 (available from Atago Co., Ltd.)

The test piece was heated at a rate of 1 degree C./minute from 5 degrees C., and the refractive index of the test piece immediately after the stage temperature reached 40 degrees C. was obtained as n0. With the stage temperature kept at 40 degrees C., the refractive indices of the test piece were measured at 10 minute intervals, as n10, n20, n30, . . . , and n10x. Using a value x in the refractive index n10x when a relationship of n10x/n10(x−1)*100≥95 was established, "high-speed refractive index responsiveness" was evaluated according to the evaluation criteria described below.

[Evaluation Criteria]

x was from 1 through 3: 10 points
x was from 4 through 5: 9 points
x was 6: 8 points
x was 7: 7 points
x was 8: 6 points
x was 9: 5 points
x was 10 or greater: 1 point Note that when the change width between a refractive index at 5 degrees C. and a refractive index at 40 degrees C. is less than 0.01, it is to be judged that there is no refractive index change. In this case, the mark to be given is 0 points.

<Photo-Switching Function>

The photo-switching function of the obtained polymer and resin composition was evaluated with a spectrophotometer in the manner described below.

Apparatus: 1H3LNWWP (available from Horiba, Ltd.)

A sample was spin-coated on a quartz glass, to form a coating film having a thickness of 10 micrometers. Subsequently, the coating film was set in the spectrophotometer such that the coating film was at an angle of 45 degrees with respect to incident light, to measure a transmittance T5 of 400 nm at 5 degrees C. and a transmittance T40 of 400 nm at 40 degrees C. The "photo-switching function" depending on the temperature of linear light was evaluated according to the evaluation criteria described below.

[Evaluation Criteria]
T40/T5 was lower than 60%: 20 points
T40/T5 was 60% or higher but lower than 70%: 18 points
T40/T5 was 70% or higher but lower than 80%: 16 points
T40/T5 was 80% or higher but lower than 90%: 14 points
T40/T5 was 90% or higher: 1 point <Tensile Strength>

Tensile strength of the obtained polymer and resin composition was evaluated with a tensile tester in the manner described below.

Apparatus: AUTOGRAPH AGS J (available from Shimadzu Corporation)

The sample was molded by hot melt molding into a strip shape having a width of 10 mm, a thickness of 25 micrometers, and a length of 150 mm, and the tensile strength of the strip was measured, to evaluate "tensile strength" according to the evaluation criteria described below.

[Evaluation Criteria]
The break strength was 10 N/cm or higher: 10 points
The break strength was 2 N/cm or higher but lower than 10 N/cm: 7 points
The break strength was lower than 2 N/cm: 1 point <Visible Light Transmittance>

Visible light transmittance of the obtained polymer and resin composition was evaluated with a spectrophotometer in the manner described below.

Apparatus: spectrophotometer V-660DS (available from JASCO Corporation)

The sample was molded by hot melt molding into a strip shape having a thickness of 25 micrometers and a length of 150 mm. The strip was set in the spectrophotometer, to measure transmittance at 40 degrees C. Values of transmittance of 400 nm, 500 nm, 600 nm, and 700 nm were averaged, to evaluate "visible light transmittance" according to the evaluation criteria described below.

[Evaluation Criteria]
90% or higher: 5 points
Lower than 90%: 0 points

<Total Evaluation>

A total mark was obtained by summing up the marks in the evaluations described above (full mark: 60 points), to perform total evaluation according to the evaluation criteria described below. A product evaluated as G or higher was of a practically usable level.

[Evaluation Criteria]
A: 50 points or higher but 60 points or lower
B: 45 points or higher but lower than 50 points
C: 40 points or higher but lower than 45 points
D: 35 points or higher but lower than 40 points
E: 30 points or higher but lower than 35 points
F: 20 points or higher but lower than 30 points
G: 10 points or higher but lower than 20 points
H: Lower than 10 points

TABLE 4

| | | Refractive index change repetition durability | | High-speed refractive index responsiveness | | Photo-switching function | | Tensile strength (N/cm) | | Visible light transmittance | | Total evaluation | |
|---|---|---|---|---|---|---|---|---|---|---|---|---|---|
| | | Mark | Actually measured value | Mark | Actually measured value | Mark | Actually measured value | Mark | Actually measured value | Mark | Actually measured value | Mark | Rank |
| Ex. | 1 | 10 | 85 | 7 | 7 | 16 | 73 | 7 | 8.5 | 5 | 95 | 45 | B |
| | 2 | 10 | 83 | 8 | 6 | 18 | 62 | 7 | 9.4 | 5 | 97 | 48 | B |
| | 3 | 10 | 80 | 9 | 4 | 20 | 58 | 7 | 8.6 | 5 | 96 | 51 | A |
| | 4 | 10 | 75 | 9 | 5 | 18 | 66 | 1 | 1.2 | 5 | 96 | 43 | C |
| | 5 | 10 | 77 | 10 | 9 | 16 | 70 | 1 | 1.2 | 5 | 94 | 42 | C |
| | 6 | 10 | 72 | 9 | 5 | 16 | 71 | 1 | 1.3 | 5 | 97 | 41 | C |
| | 7 | 10 | 70 | 7 | 7 | 16 | 73 | 1 | 1.4 | 5 | 95 | 39 | D |
| | 8 | 10 | 71 | 5 | 9 | 16 | 77 | 1 | 1.9 | 5 | 96 | 37 | D |
| Ref. Ex. | 9 | 10 | 71 | 1 | 10 | 16 | 79 | 1 | 1.8 | 5 | 94 | 33 | E |
| Ex. | 10 | 10 | 70 | 1 | 10 | 14 | 83 | 1 | 1.4 | 5 | 92 | 31 | E |
| Comp. Ex. | 1 | 0 | 0 | 0 | 0 | 1 | 96 | 1 | 1.3 | 5 | 96 | 7 | H |
| | 2 | 0 | 0 | 0 | 0 | 1 | 97 | 1 | 1.4 | 5 | 95 | 7 | H |
| | 3 | 0 | 0 | 0 | 0 | 1 | 97 | 1 | 1.3 | 5 | 97 | 7 | H |
| | 4 | 0 | 0 | 0 | 0 | 1 | 96 | 1 | 1.4 | 5 | 96 | 7 | H |
| Ref. Ex. | 1 | 0 | 0 | 0 | 0 | 1 | 98 | 7 | 8.2 | 5 | 97 | 13 | G |

The embodiments of the present disclosure are, for example, as follows:

<1> A polymer including a temperature-responsive unit in a molecule, wherein the polymer has a refractive index difference (B−A) of 0.01 or greater but 0.2 or less between a minimum refractive index A of the polymer in a temperature range of 5 degrees C. or higher but lower than 30 degrees C. and a maximum refractive index B of the polymer in a temperature range of 30 degrees C. or higher but lower than 50 degrees C.

<2> The polymer according to <1>, wherein the temperature-responsive unit is a hydrogen bond unit.

<3> The polymer according to <1> to <2>,
wherein the polymer has a glass transition temperature of −50 degrees C. or higher but lower than 80 degrees C.
<4> The polymer according to any one of <1> to <3>, further including an ether bond in the molecule.
<5> The polymer according to <4>,
wherein the hydrogen bond unit includes an amide bond, and wherein the ether bond is an alkyl ether structure.
<6> The polymer according to any one of <1> to <5>, wherein the polymer has a number average molecular weight of from 1,000 through 1,000,000.
<7> The polymer according to any one of <1> to <6>, wherein the polymer has a weight average molecular weight of from 1,000 through 1,000,000.
<8> The polymer according to any one of <1> to <7>, wherein a molecular weight distribution (weight average molecular weight/number average molecular weight) of the polymer is from 1.0 through 3.0.
<9> The polymer according to any one of <1> to <8>, further including:
a structural unit attributable to N-isopropyl acrylamide; and
a structural unit attributable to the phenoxypolyethylene glycol acrylate.
<10> The polymer according to <9>,
wherein a ratio (structural unit attributable to N-isopropyl acrylamide:structural unit attributable to phenoxypolyethylene glycol acrylate) between the structural unit attributable to N-isopropyl acrylamide and the structural unit attributable to the phenoxypolyethylene glycol acrylate is from 6:4 through 3:7.
<11> A resin composition including
the polymer according to any one of <1> to <10> in an amount of 100 ppm by mass or greater.
<12> The resin composition according to <11>, further including a polyglycerin stearic acid ester.
<13> A light control material including
the polymer according to any one of <1> to <10> or the resin composition according to <11> or <12>.
<14> An optical waveguide material including
the polymer according to any one of <1> to <10> or the resin composition according to <11> or <12>.
<15> An athermal optical element including
the polymer according to any one of <1> to <10> or the resin composition according to <11> or <12>.
<16> A color display element including
the polymer according to any one of <1> to <10> or the resin composition according to <11> or <12>.
<17> The color display element according to <16>,
wherein the color display element is a color filter.
<18> An optical material including
the polymer according to any one of <1> to <10> or the resin composition according to <11> or <12>.
<19> The optical material according to <18>,
wherein the optical material is a lens.
<20> The optical material according to <18>,
wherein the optical material is an optical diode.

The polymer according to any one of <1> to <10>, the resin composition according to <11> or <12>, the light control material according to <13>, the optical waveguide material according to <14>, the athermal optical element according to <15>, the color display element according to <16> or <17>, and the optical material according to any one of <18> to <20> can solve the various problems in the related art and can achieve the object of the present disclosure.

What is claimed is:
1. A polymer, comprising, in a molecule thereof:
a structure represented by formula (3):

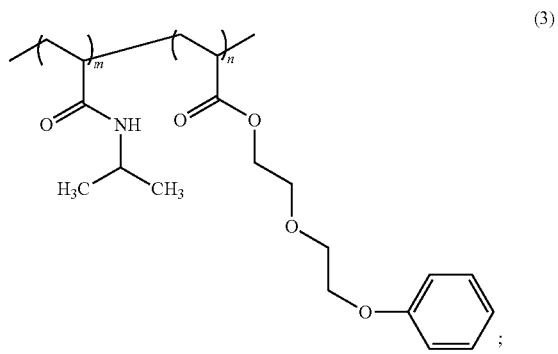

wherein m and n are independently a value greater than 0, and wherein the polymer has a refractive index difference B−A of 0.01 or greater but 0.2 or less between a minimum refractive index A of the polymer in a temperature range of 5 degrees C. or higher but lower than 30 degrees C. and a maximum refractive index B of the polymer in a temperature range of 30 degrees C. or higher but lower than 50 degrees C., and
wherein the polymer has a glass transition temperature of −50 degrees C. or higher but lower than 80 degrees C.
2. A resin composition, comprising:
the polymer according to claim 1 in an amount of 100 ppm by mass or greater.
3. A light control material, comprising:
the polymer according to claim 1.
4. An optical waveguide material, comprising:
the polymer according to claim 1.
5. An athermal optical element, comprising:
the polymer according to claim 1.
6. A color display element, comprising: the polymer according to claim 1.
7. An optical material, comprising:
the polymer according to claim 1.
8. A light control material, comprising:
the resin composition according to claim 2.
9. An optical waveguide material, comprising:
the resin composition according to claim 2.
10. An athermal optical element, comprising:
the resin composition according to claim 2.
11. A color display element, comprising:
the resin composition according to claim 2.
12. An optical material, comprising:
the resin composition according to claim 2.
13. The polymer according to claim 1, wherein the polymer has a weight average molecular weight of from 1,000 to 1,000,000.
14. The resin composition according to claim 2, wherein the polymer has a weight average molecular weight of from 1,000 to 1,000,000.
15. The polymer according to claim 1, wherein a ratio of m to n (m:n) in the formula (3) is from 6:4 to 3:7.

* * * * *